Dec. 14, 1965   E. J. ZEITLIN   3,223,989
RECORDING METER ALARM
Filed May 15, 1962
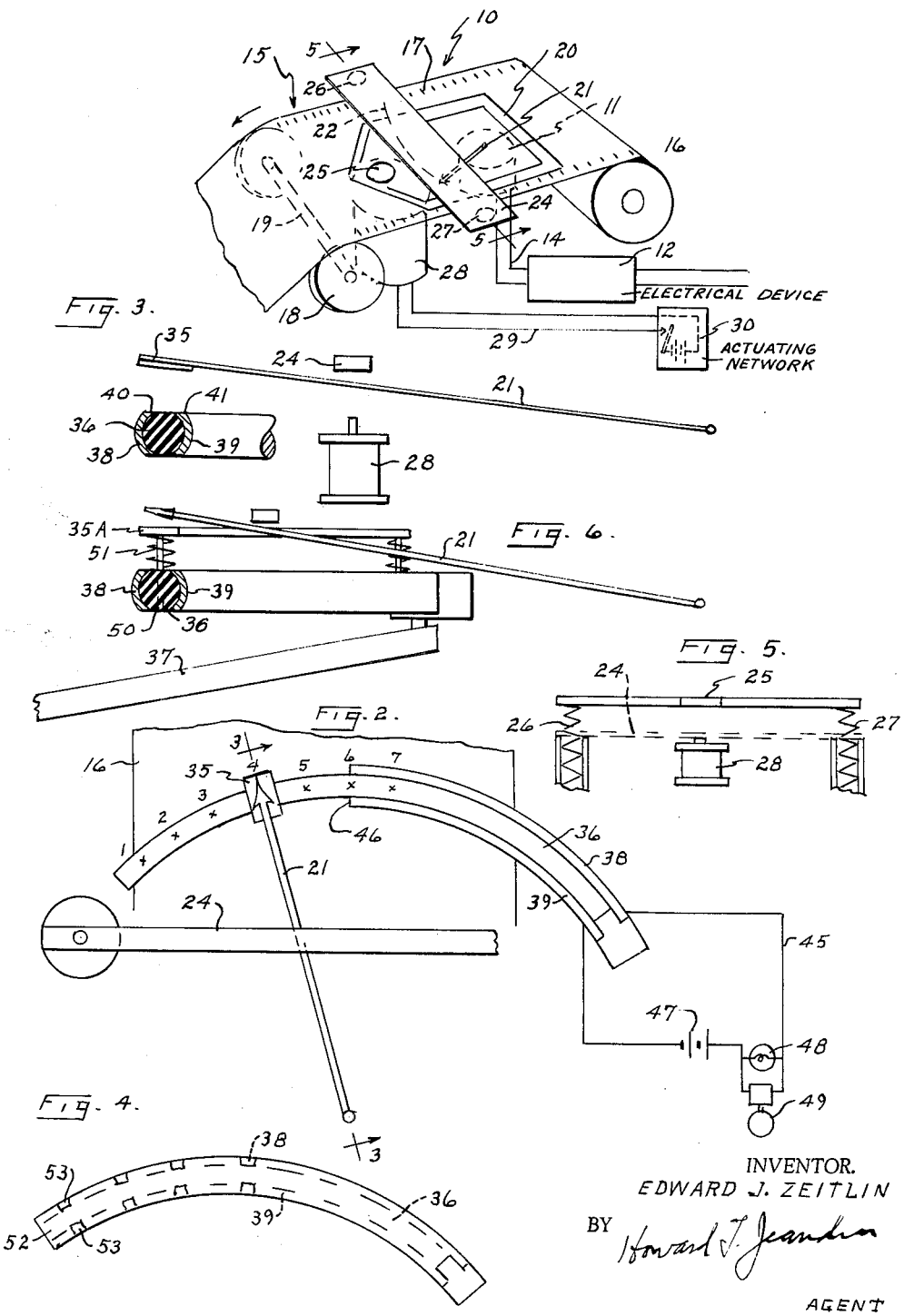
INVENTOR.
EDWARD J. ZEITLIN
BY Howard J. Jeandron
AGENT United States Patent Office 3,223,989
Patented Dec. 14, 1965

3,223,989
RECORDING METER ALARM
Edward J. Zeitlin, Peekskill, N.Y.
(657 Broadway, New York, N.Y.)
Filed May 15, 1962, Ser. No. 194,762
5 Claims. (Cl. 340—266)

This invention relates to recording instruments and more particularly to a recording meter in which there is an indicating needle that swings over an arc to indicate minimum to maximum measurement of an electrical network and in which the needle is movable by an external source to print or close a further electrical network to indicate the position of the needle.

The prior art illustrates many measuring and recording instruments and meters in which a needle is similarly actuated over an arc to indicate minimum and maximum measurement and in which advantage is taken of the use of the needle to indicate the measurement of the network or device being measured. For example, in Patent 843,-189, to Willis, the needle is a double ended needle and the needle is used to conduct the potential from one side of the network to each of the contacts for the recording measurement and in Patent 907,235 to Herrick the needle is similarly utilized to conduct the potential from one side of the network to any one of the particular conductors. Similarly in Patent 2,467,948 to Strum et al., the needle is a conducting element to connect one side of the network to the other side to permit a recording.

In this invention although the device such as a recording instrument may be similar to the devices utilized in the prior art, the needle of the meter measuring the particular electrical network to be measured is utilized not as a conductive element. The needle is utilized in reality as a switch to close a circuit at any predetermined position over the entire range of the measuring meter.

It is an object of this invention to provide a needle operated recording instrument with a non-conductive needle to provide the means of closing an external circuit at any predetermined reading on said meter.

It is a further object of this invention to provide a recording meter in which a non-conductive indicating needle is utilized and in which the end of said needle provides the means to close an external circuit for a recording or an alarm.

Other objects of this invention shall be apparent by reference to the accompanying detailed description and the drawings in which FIG. 1 is a schematic illustration of the device,
FIG. 2 is a schematic illustration of the recording needle and its associated non-conductive and conductive scale,
FIG. 3 is a cross sectional view taken on line 3—3 of FIG. 2,
FIG. 4 illustrates a further embodiment of this invention,
FIG. 5 is a cross sectional view taken on line 5—5 of FIG. 1, and
FIG. 6 is a still further embodiment of this invention.

Referring to the drawings and particularly FIG. 1 there is illustrated a schematic showing of a recorder 10, and a shielded D'Arsonval internal-core galvanometer 11 having an impedance of arcuate form that is approximately a 180° sector and is utilized to measure any electrical device 12 to which the recorder may be connected by means of a connecting circuit 14. The recording instrument includes a tape recorder 15 comprised of a paper tape 16 in the form of a roll having perforations 17 on both edges and having a pair of motor driven sprockets 18 both on a single axle 19 positioned so the paper tape 16 will feed over the sprockets 18 and be moved forward (left) according to the drive of axle 19. With a time recorder, axle 19 is simply connected to a clock movement (not shown). The meter 11 is positioned over tape 16 as illustrated in FIG. 1; meter 11 is supported by a framework 20 which is supported externally (not shown). Meter 11 is provided with a needle 21 that will swing over an arc 22 from one side of tape 16 to the opposite side to indicate minimum to maximum measurement of the electrical potential being measured through network 12. A bar 24 is supported above needle 21 and extends over the entire range of the movement of needle 21. Bar 24 is supported on either side on resilient elements 26–27 (FIG. 5). Bar 24 at its center is provided with a solenoid 28, the solenoid 28 being connected by conductor wires 29 to a switch actuating network 30 that supplies the necessary potential which may or may not be a time switch actuated network, that is, solenoid 28 may be operated by a clock providing an impulse of potential through conductors 29 every second or minute or hour as desired. Each impulse through conductors 29 will energize solenoid 28 and pull bar 24 downward (FIG. 5). Each movement of bar 24 downward will in turn pull needle 21 down and permit the end of needle 21 as a marking needle to provide a marked indication of each impulse thus providing a record on tape 16 and if tape 16 is driven by a clock movement at a timed speed to indicate seconds, minutes and hours, the recording of needle 21 would provide the measured potential of network 12 at each of the time intervals desired. Referring to FIG. 2 there is a schematic illustration in which needle 21 is provided with a conductive pad or switch element 35. In this embodiment with tape 16 and bar 24 similarly used there is also provided an arc shaped bar 36 (FIGS. 2 and 4) supported on an arm 37 (FIG. 6) that is pivotally mounted on the same center as needle 21. Bar 37 is manually moved to any predetermined position as desired. Bar 36 is provided with two conductive elements 38 and 39 on either side of bar 36 with the top edges 40 and 41 of elements 38 and 39 (FIG. 3) in a single plane, so that when elements 38 and 39 are in alignment with pad 35, pad 35 of needle 21 (FIG. 3) will, when forced downward by bar 24, bridge the gap between elements 38 and 39 to close a circuit 45 (FIG. 2). The utility of this device may be in the form of an alarm circuit, that is, with the meter 11 connected to a device or network wherein the potential may rise to a given value but any rise above that value requires an alarm. This may be connected with the r.p.m. of a machine or device as the case may be and excessive r.p.m. requires an alarm to be set off. Thus when the potential through network 12 rises above a predetermined value, bar 36, FIG. 2, provides the means to indicate the alarm. For example, if meter 11 is indicating the r.p.m. of a device and the safe r.p.m. runs up to 6,000, bar 36 is moved so that the end 46 of bar 36 will be at the position where needle 21 would indicate 6,000 r.p.m. Needle 21 may be manually or electrically actuated by bar 24 to indicate the r.p.m. readings. For example, FIG. 2, the first reading may show 1,000 r.p.m., the second 2,000 r.p.m., the third 3,000 r.p.m., the fourth 4,000 r.p.m., the fifth 5,000 r.p.m. and on the sixth reading of 6,000 r.p.m. needle 21 by means of bar 24 will force pad or switch element 35 down upon bar 36 closing the contact between elements 38 and 39 which immediately closes circuit 45 that is connected to elements 38 and 39 and through battery 47 to a light element 48 and a buzzer 49 thus providing a visual and audible alarm when the meter indicates a 6,000 r.p.m. reading. Referring to FIG. 6, bar 36 is similarly provided with conductive elements 38 and 39. However an arcuate shaped pad 35A is supported above bar 36 by pins 50 resting on resilient springs 51. In this embodiment conductive pad 35A is not a part of the needle 21 but is similarly depressed by the needle 21 when bar 24 depresses needle 21 thus in the same manner closing a contact between conductive elements 38 and 39.

Referring to FIG. 4 a still further embodiment of the invention is shown. In this embodiment bar 36 is similarly provided with the conductive elements 38 and 39 but a non-conductive sleeve 52 covers the entire assembly. The sleeve 52 may have opposed perforations 53 at any predetermined position along bar 36. Thus with bar 36 and sleeve 52 positioned as shown in FIG. 2 more than one alarm reading may be recorded, that is, bar 36 may be set so that a reading of 3,000 r.p.m. will indicate an alarm, a reading of 4,000 r.p.m. will again indicate an alarm, a reading of 5,000 r.p.m. will again indicate an alarm, etc.

Although the device has been illustrated in conjunction with a tape recording instrument, it is apparent that this device may be coordinated with any meter using the needle indicator in which means is provided to depress the needle and thus provide the means of closing a contact between two conductors at any predetermined position within the range of movement of the needle and although the device has been illustrated with a conductive or switch element on the end of the recording needle and with a conductive element or switch depressed by the indicating needle, various changes may be made to cause a closing between two conductive elements at any position of the needle without departing from the spirit of this invention and this invention shall be limited only by the appended claims.

What is claimed is:

1. An alarm actuating meter comprised of a source of electric voltage, a galvanometer having an impedance of arcuate form occupying a sector of approximately 180° connected to said source of electric voltage, a non-conductive rotating needle movable in the arc of said impedance, said needle of said meter moving in response to the voltage through an electrical device under test, a solenoid, an actuating bar, said actuating bar depressed by said solenoid, said actuating bar positioned to be depressed against said rotating needle, a switch and potential electrically connected to said solenoid, an arcuate shaped bar provided with two conductive elements one on each side of said arcuate shaped bar, a conductive pad to span and be moved by said needle into contact with said two conductive faces of said arcuate shaped bar, said arcuate shaped bar positioned under said actuating bar and pivotally supported to align with said arc of said impedance and pivotally adjustable with relation to said impedance arc, said two conductive elements of said arcuate shaped bar connected to an alarm circuit to actuate an alarm when said actuating switch is closed and said actuating bar is depressed.

2. In a device according to claim 1 in which an arcuate shaped conductive pad is resiliently mounted between but not in contact with the rotating needle and the arcuate shaped bar, to be depressed when said actuating bar is depressed to contact both conductive elements of said arcuate shaped bar.

3. In a recording meter having a galvanometer with an arcuate form impedance and a non-conductive rotating needle movable in contact with said impedance, said needle of said meter moving in response to the voltage through an electrical device under test, a solenoid and actuating bar, an actuating switch and potential electrically connected to said solenoid, said actuating bar depressed by said solenoid and positioned to be depressed against said rotating needle, said meter provided with an arcuate shaped bar having two separated conductive faces one on each side of said bar, said conductive faces connected to an indicating circuit, said arcuate shaped bar positioned under said actuating bar and pivotally supported for rotational alignment with said arc of said impedance of said meter, a conductive pad to mate with and be moved by said needle into contact with said two conductive faces of said arcuate shaped bar, said actuating bar positioned adjacent said needle to depress said needle each time said actuating bar is depressed.

4. In a device according to claim 3 in which said conductive pad is spaced from and positioned between said needle and said arcuate shaped bar.

5. In a device according to claim 3 in which there are a plurality of predetermined points at which the indicating circuit may be closed.

References Cited by the Examiner

UNITED STATES PATENTS

| | | | |
|---|---|---|---|
| 504,335 | 9/1893 | Egan et al. | |
| 996,120 | 6/1911 | Norton | 200—56 |
| 1,573,950 | 2/1926 | Torgersen | 340—194 |
| 1,699,759 | 1/1929 | Shepherd. | |
| 2,319,494 | 5/1943 | Dusdieker | 200—56 |
| 2,426,209 | 8/1947 | Hartley. | |

OTHER REFERENCES

Electronic Design: vol. 4, No. 14, pages 36, 37, July 15, 1956.

NEIL C. READ, *Primary Examiner.*

DANIEL K. MYERS, *Assistant Examiner.*